United States Patent
Kaji

(10) Patent No.: US 8,800,617 B2
(45) Date of Patent: Aug. 12, 2014

(54) PNEUMATIC TIRE

(75) Inventor: Yoshio Kaji, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 557 days.

(21) Appl. No.: 13/129,931

(22) PCT Filed: Dec. 4, 2009

(86) PCT No.: PCT/JP2009/006650
§ 371 (c)(1),
(2), (4) Date: May 18, 2011

(87) PCT Pub. No.: WO2010/064452
PCT Pub. Date: Jun. 10, 2010

(65) Prior Publication Data
US 2011/0220260 A1 Sep. 15, 2011

(30) Foreign Application Priority Data
Dec. 5, 2008 (JP) .................................. 2008-310921

(51) Int. Cl.
*B60C 11/12* (2006.01)
*B60C 11/11* (2006.01)

(52) U.S. Cl.
USPC ............. 152/209.18; 152/209.25; 152/DIG. 3

(58) Field of Classification Search
CPC ............ B60C 11/1218; B60C 11/1263; B60C 2011/129; B60C 2011/1204; B60C 2011/1222; B60C 2011/1236; B60C 2011/124; B60C 2011/1213; B60C 11/11
USPC ................ 152/209.1, 209.18, 209.25, DIG. 3
See application file for complete search history.

(56) References Cited

U.S. PATENT DOCUMENTS

| 2003/0047263 | A1 | 3/2003 | Lopez | |
| 2005/0183807 | A1* | 8/2005 | Hildebrand | 152/209.2 |
| 2007/0295435 | A1* | 12/2007 | Nguyen et al. | 152/209.18 |

FOREIGN PATENT DOCUMENTS

JP 11-034616 A 2/1999
(Continued)

OTHER PUBLICATIONS

Chinese Office Action for Chinese Patent Application No. 200980148507.9 issued Jan. 14, 2013.
(Continued)

*Primary Examiner* — Eric Hug
(74) *Attorney, Agent, or Firm* — Sughrue Mion, PLLC

(57) ABSTRACT

There is provided a pneumatic tire to improve on-ice braking performance. A pneumatic tire comprises plural blocks on a tread surface of the tire defined by plural circumferential grooves extending in a tread circumferential direction and plural lateral grooves extending in a tread width direction and provided with plural sipes extending in the tread width direction, wherein each of the blocks is divided into plural block pieces including at least a set of a first block piece and a second block piece which are arranged next to each other, the first block piece has a width in the tread circumferential direction gradually decreasing from end portions toward a central portion of the block in the tread width direction, the second block piece has a width in the tread circumferential direction gradually increasing from end portions toward a central portion of the block in the tread width direction, the width of the first block piece in the tread circumferential direction gradually decreases toward the tread surface, and the width of the second block piece in the tread circumferential direction gradually increases toward the tread surface.

3 Claims, 9 Drawing Sheets

(56) References Cited

FOREIGN PATENT DOCUMENTS

| | | |
|---|---|---|
| JP | 2000-006619 A | 1/2000 |
| JP | 2000-233612 A | 8/2000 |
| JP | 2003-534182 A | 11/2003 |
| JP | 2006-151223 A | 6/2006 |
| JP | 2009-067348 A | 4/2009 |

OTHER PUBLICATIONS

Japanese Office Action for Japanese Patent Application No. 2008-310921 issued Jan. 22, 2013.
International Search Report PCT/JP2009/006650, Dec. 28, 2009.
Extended European Search Report issued in European Application No. 09830222.7 dated Oct. 25, 2012.

* cited by examiner (a)

(b)

(a)

(b)

(a)

(b)

(c)

(d)

PNEUMATIC TIRE

CROSS REFERENCE TO RELATED APPLICATIONS

This application is a National Stage of International Application No. PCT/JP2009/006650 filed Dec. 4, 2009, claiming priority based on Japanese Patent Application No. 2008-310921 filed Dec.5, 2008, the contents of all of which are incorporated herein by reference in their entirety.

TECHNICAL FIELD

The present invention relates to a pneumatic tire provided with a number of sipes on a tread surface of the tire to improve on-ice braking performance in particular.

RELATED ART

Conventionally, a pneumatic tire for winter comprising blocks and/or ribs (hereinafter referred to as block) of a tire tread pattern is provided with sipes extending in the tread width direction in order to improve on-ice accelerating performance at startup and braking performance.

As a conventional technique to improve on-ice braking performance in particular, JP2000-006619 discloses a pneumatic tire comprising plural blocks on a tread surface of the tire defined by plural circumferential grooves extending in the tread circumferential direction and plural lateral grooves intersecting with the circumferential grooves and provided with plural sipes, wherein the sipe has an amplitude in a direction perpendicular to the longitudinal direction of the sipe in at least a location in the depth direction and the amplitude is decreased, increased and then decreased again or increased, decreased and then increased again at least a location in the depth direction of the sipe.

In this pneumatic tire, since the amplitude of the sipe is varied in the depth direction, contacting area of block pieces divided by the sipe becomes larger as compared with that in the case of the sipe extending straight in the depth direction. In addition, since the amplitude of the sipe is varied, walls of the block piece are inclined and opposing walls easily come into contact with each other only by receiving compressional deformation. For this reason, the contacting force of the block pieces when the block is deformed comes stronger and the block can be restrained from collapsing than the conventional ones at the time of braking drive even when the number of sipes is increased so that reduction in ground contact area due to block collapse can be restrained.

DISCLOSURE OF THE INVENTION

Problems to be Solved by the Invention

Considering improvement of on-ice friction performance of a tire, it is necessary to increase both of "ground contact area of a block with an icy road" and "force to dig up an icy road by a block edge portion". However, in the above-mentioned pneumatic tire, reduction in ground contact area can be restrained by restraining block collapse while edge pressure for every block piece divided by sipes is reduced. Therefore, the sufficient effect by addition of sipes cannot be obtained and there is room for improvement about on-ice performance.

Therefore, it is an object of the present invention to solve the above-mentioned problems and to provide a pneumatic tire to further improve on-ice braking performance in particular by balancing the competing features of "increase in edge pressure" and "increase in ground contact area".

Means for Solving the Problem

The subject matters of the present invention are as follows.
(1) A pneumatic tire comprising plural blocks on a tread surface of the tire defined by plural circumferential grooves extending in a tread circumferential direction and plural lateral grooves extending in a tread width direction and provided with plural sipes extending in the tread width direction, wherein
each of the blocks is divided into plural block pieces including at least set of a first block piece and a second block piece which are arranged next to each other,
the first block piece has a width in the tread circumferential direction gradually decreasing from end portions toward a central portion of the block in the tread width direction,
the second block piece has a width in the tread circumferential direction gradually increasing from end portions toward a central portion of the block in the tread width direction,
the width of the first block piece in the tread circumferential direction gradually decreases toward the tread surface, and
the width of the second block piece in the tread circumferential direction gradually increases toward the tread surface.
(2) The pneumatic tire according to the above item (1), wherein
the width of the first block piece in the tread circumferential direction gradually increases and then gradually decreases along a tire radial direction from an inner side to an outer side, and
the width of the second block piece in the tread circumferential direction gradually decreases and then gradually increases along the tire radial direction from an inner side to an outer side.
(3) The pneumatic tire according to the above item (1) or (2), wherein
a side wall of the first block piece and a side wall of the second block piece facing each other across the sipe have an equal curvature.
(4) The pneumatic tire according to any one of the above items (1) to (3), wherein
at least one bottom raised portion connecting the first block piece and the second block piece is provided between the first block piece and the second block piece.

Effect of the Invention

According to the present invention, since the first and second block pieces share roles to achieve both of increase in ground contact area and increase in edge pressure, it is possible to provide a pneumatic tire to improve on-ice braking performance in particular.

DESCRIPTION OF REFERENCE NUMERALS

| | |
|---|---|
| CL | tire equator |
| 1 | tread surface |
| 2 | circumferential groove |
| 4 | lateral groove |
| 15 | icy road surface |
| 20 | block |
| 21 | sipe |
| 22T | first block piece |
| 22R | second block piece |
| 23 | block piece surface |
| 24 | bottom raised portion |

BEST MODE FOR CARRYING OUT THE INVENTION

Hereinafter, embodiments of a pneumatic tire according to the present invention will be described in detail with reference to drawings.

In addition, internal reinforcement structures of a tire and the like is not illustrated since they are similar to those of a general radial tire.

Figure 1:
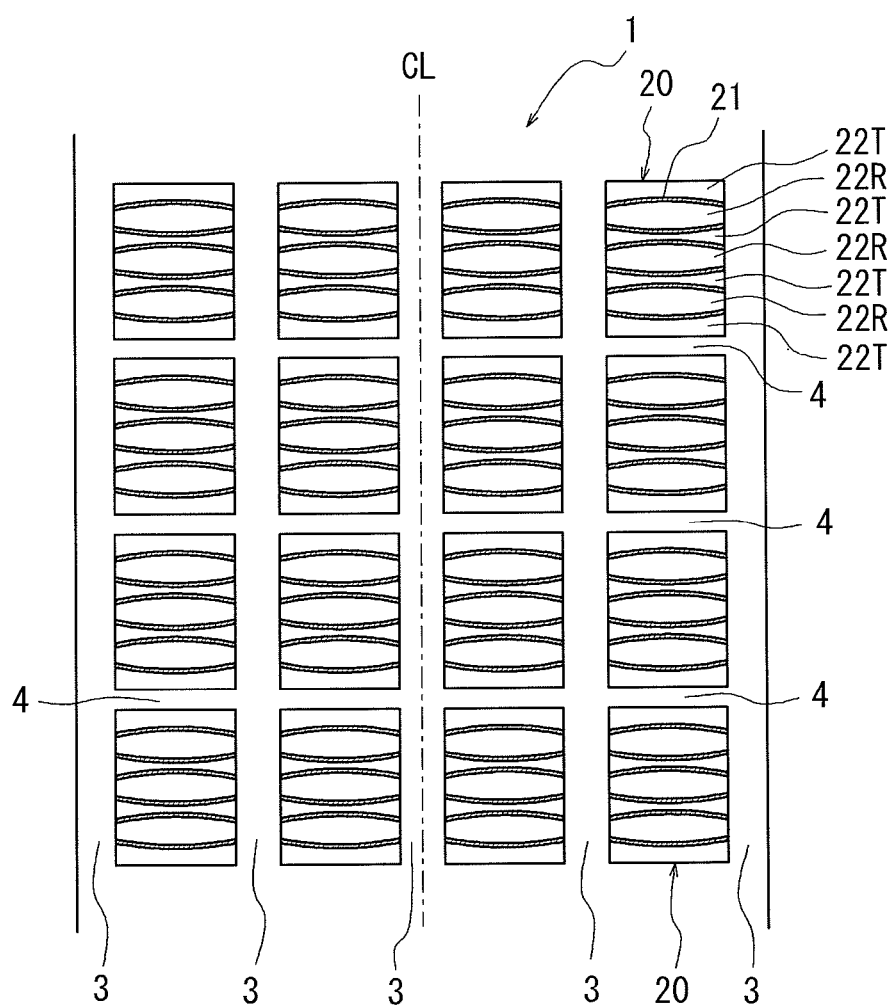
FIG. 1 is a development view of a tread pattern showing an embodiment of a pneumatic tire of the present invention.

FIG. 1 is a development view of a tread pattern showing an embodiment of a pneumatic tire of the present invention.

The tread pattern as illustrated is provided with plural blocks 20 on a tread surface 1 of the tire defined by plural circumferential grooves 3 extending in the tread circumferential direction parallel to the tire equator CL and plural lateral grooves 4 extending in the tread width direction. This block 20 is provided with plural sipes 21 extending in the tread width direction. The sipes 21 pass through the block 20 for connecting the adjacent circumferential grooves 3 and divide the block 20 into plural, seven block pieces in this illustrative example.

While two blocks 20 are arranged on each side of the tire equator CL in the tread width direction in this illustrative example, the number of the block 20 is not limited to this illustrative example. For example, asymmetry arrangement having two rows in one side and three rows in the other side across the tire equator CL in the tread width direction may be possible.

Figure 2:
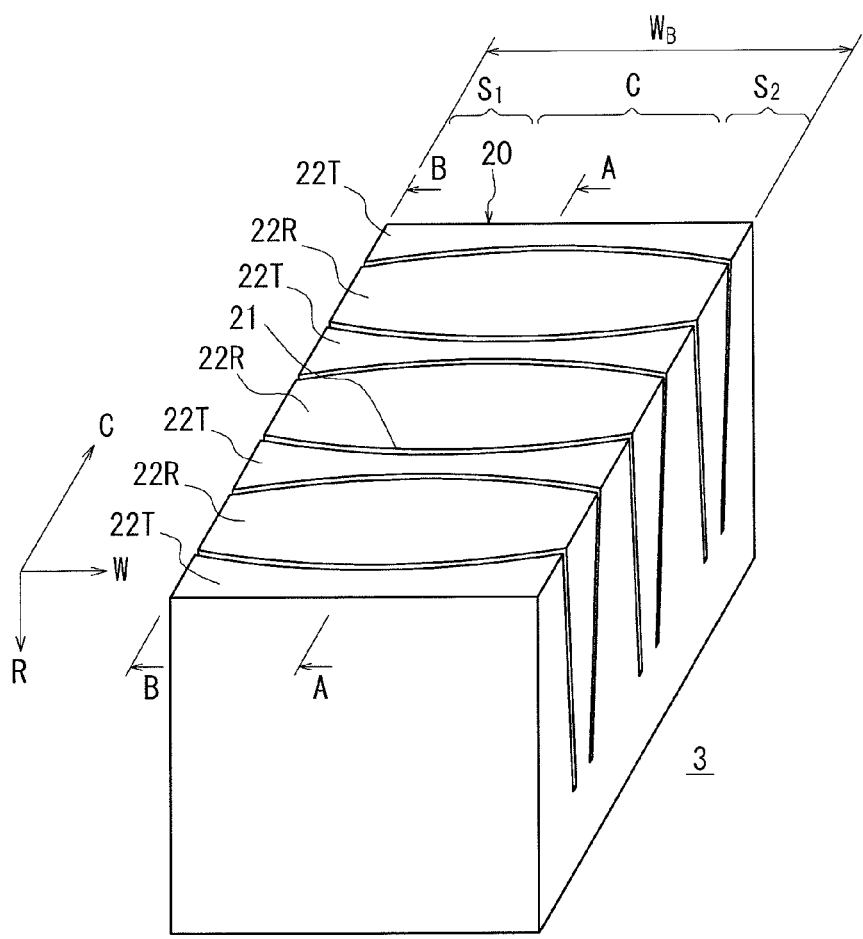
FIG. 2 is a perspective view of a block according to the first embodiment of a pneumatic tire of the present invention.

FIG. 2 is a perspective view of the block 20 according to the first embodiment of a pneumatic tire of the present invention. In this figure, the tread circumferential direction C, tread width direction W and the tire radial direction R (direction of arrow indicates the tire radially inner side) are indicated by arrows.

Each block 20 has at least a set of a first block piece 22T and a second block piece 22R which are arranged next to each other. The first block piece 22T has a width in the tread width direction gradually decreasing from end portions $S_1$, $S_2$ toward a central portion C of the block 20 in the tread width direction. As for the first block piece 22T arranged in an edge in the tread circumferential direction, a wall surface inside of the block gradually decreases while a wall surface outside of the block does not gradually decrease. The second block piece 22R has a width in the tread width direction gradually increasing from end portions $S_1$, $S_2$ toward a central portion C of the block 20 in the tread width direction.

In addition, the width of the first block piece 22T in the tread circumferential direction gradually decreases from the radially inner side (a bottom of the sipe 21) toward the tread surface while the width of the second block piece 22R in the tread circumferential direction gradually increases from the tire radially inner side (the bottom of the sipe 21) toward the tread surface. In other words, the sipe 21 is not perpendicular but inclined with respective to the tread surface as apparent from the side view of the block 20.

The central portion C of the block 20 in the tread width direction indicates a region including a center line of the block 20 in the tread width direction and having a width of not more than 50% of a width $W_B$ of the block 20 as the center line being as a center. The end portions $S_1$, $S_2$ of the block 20 in the tread width direction indicate regions on both sides of the central portion C.

Figure 3:
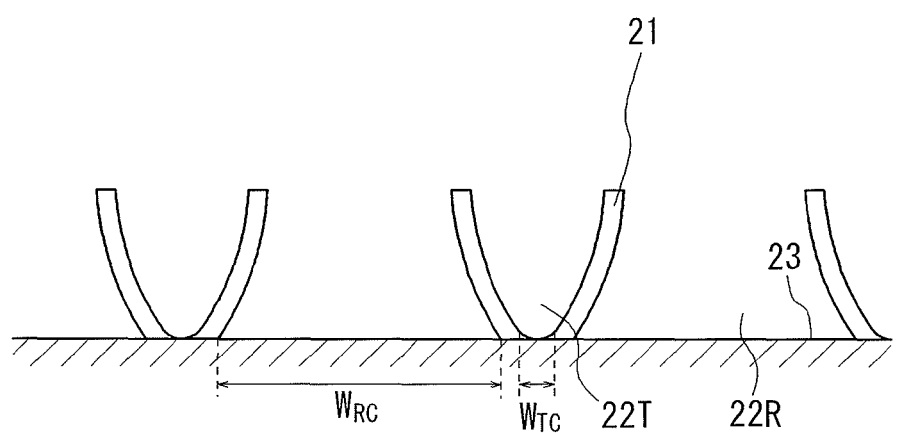
FIG. 3(*a*) is a sectional view of a block taken along A-A line of FIG. 2 and FIG. 3(*b*) is a sectional view of a block taken along B-B line of FIG. 2.
Figure 3:
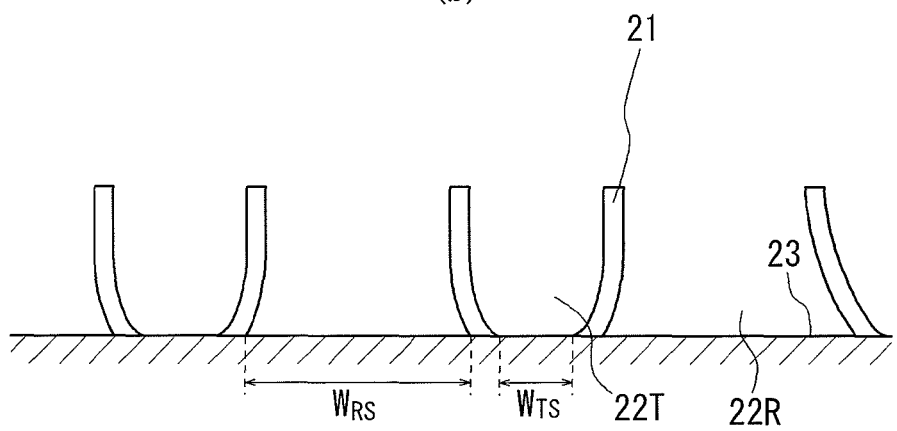

With reference to FIG. 3, the first block piece 22T and the second block piece 22R according to the first embodiment will be described. FIG. 3(a) is a sectional view of a block taken along A-A line of FIG. 2, that is, a sectional view of the block 20 in the central portion C in the tread width direction and FIG. 3(b) is a sectional view of a block taken along B-B line of FIG. 2, that is, a sectional view of the block 20 in the end portion $S_1$ in the tread width direction.

The width $W_{TC}$ of the first block piece 22T in the tread circumferential direction in the central portion C of the block 20 in the tread width direction shown in FIG. 3(a) is shorter than the width $W_{TS}$ of the first block piece 22T in the tread circumferential direction in the end portion $S_1$ of the block 20 in the tread width direction shown in FIG. 3(b). In other words, since the first block piece 22T has the width gradually decreasing from the end portions $S_1$, $S_2$ toward the central portion C of the block 20 in the tread width direction, the ground contact area of the first block piece 22T in the central portion C in the tread width direction is smaller than that in the end portions $S_1$, $S_2$ in the tread width direction.

In addition, the width $W_{RC}$ of the second block piece 22R in the tread circumferential direction in the central portion C of the block 20 in the tread width direction shown in FIG. 3(a) is longer than the width $W_{RS}$ of the second block piece 22R in the tread circumferential direction in the end portion $S_1$ of the block 20 in the tread width direction shown in FIG. 3(b). In other words, since the second block piece 22R has the width gradually increasing from the end portions $S_1$, $S_2$ toward the central portion C of the block 20 in the tread width direction, the ground contact area of the second block piece 22R in the central portion C in the tread width direction is larger than that in the end portions $S_1$, $S_2$ in the tread width direction.

Figure 4:
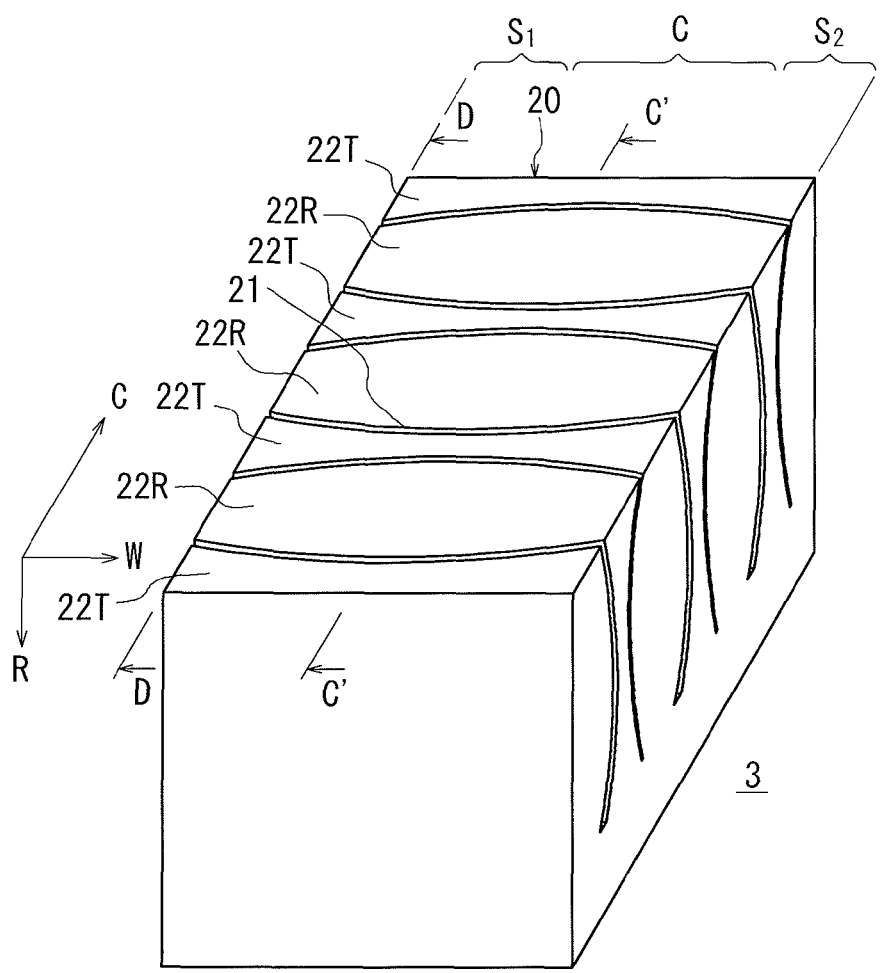
FIG. 4 is a perspective view of a block according to the second embodiment of a pneumatic tire of the present invention.

FIG. 4 is a perspective view of the block 20 according to the second embodiment of a pneumatic tire of the present invention. The configuration of FIG. 4 is different from that of FIG. 2 in that the inclination direction of the sipe 21 is changed in the vicinity of the tire radially central portion of the block 20 as apparent from the side view of the block 20. In other words, the width of the first block piece 22T in the tread circumferential direction gradually increases and then gradually decreases along the tire radial direction from the inner to outer side, and the width of the second block piece 22R in the tread circumferential direction gradually decreases and then gradually increases along the tire radial direction from the inner to outer side.

Figure 5:
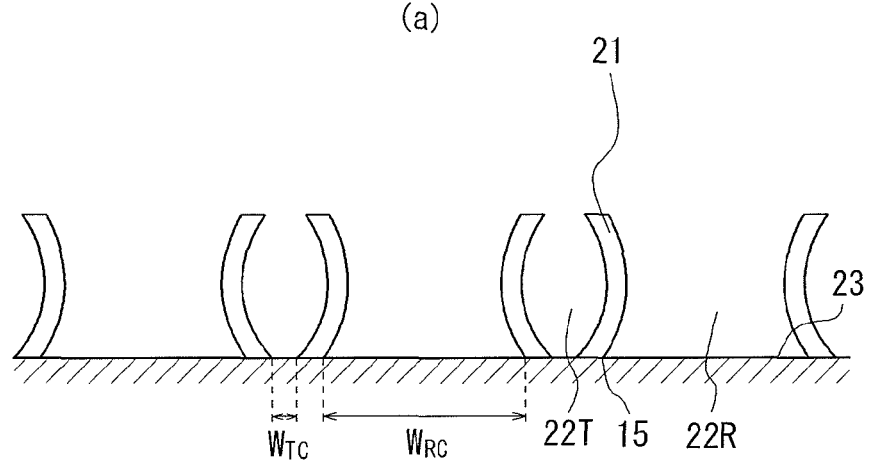
FIG. 5(a) is a sectional view of a block taken along C'-C' line of FIG. 4
FIG. 5(b) is a sectional view of a block taken along D-D line of FIG. 4.
Figure 5:
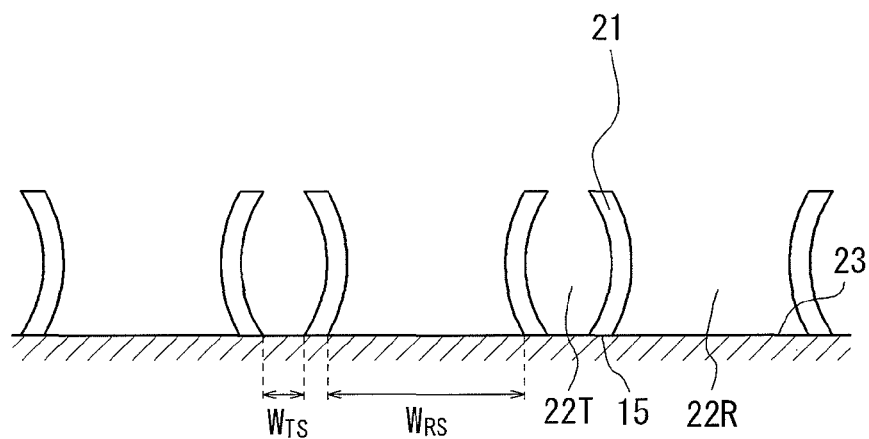

With reference to FIG. 5, the first block piece 22T and the second block piece 22R according to the second embodiment will be described. FIG. 5(a) is a sectional view of a block taken along C'-C' line of FIG. 4, that is, a sectional view of the block 20 in the central portion C in the tread width direction and FIG. 5(b) is a sectional view of a block taken along D-D line of FIG. 4, that is, a sectional view of the block 20 in the end portion $S_1$ in the tread width direction.

The first block piece 22T has the width in the tread circumferential direction gradually increasing and then gradually decreasing along the tire radial direction from the inner side (the bottom of the sipe 21) to the outer side. On the other hand, the second block piece 22R has the width in the tread circumferential direction gradually decreasing and then gradually increasing along the tire radial direction from the inner side (the bottom of the sipe 21) to the outer side. In the example of FIG. 5, in the sectional view of the tire in the circumferential direction, the first block piece 22T has a so-called barrel shape with the largest width in the tread circumferential direction in the middle portion in the depth direction of the sipe 21. In addition, the side wall of the sipe 21 shown in the sectional view forms into a smooth arc and the center of curvature lies in the inner side direction of the first block piece 22T with respect to the side wall. On the other hand, the second block piece 22R has a so-called trumpet shape with the smallest width in the tread circumferential direction in the middle portion in the depth direction of the sipe 21. In addition, the side wall of the sipe 21 shown in the sectional view forms into a smooth arc and the center of curvature lies in the outer side direction of the second block piece 22R with respect to the side wall.

In both cases that the block piece has the barrel shape and the trumpet shape, the width $W_{TC}$ of the first block piece 22T in the tread circumferential direction in the central portion C of the block 20 in the tread width direction shown in FIG. 5(a) is shorter than the width $W_{TS}$ of the first block piece 22T in the tread circumferential direction in the end portion $S_1$ of the block 20 in the tread width direction shown in FIG. 5(b). In other words, since the first block piece 22T has the width gradually decreasing from the end portions $S_1$, $S_2$ toward the central portion C of the block 20 in the tread width direction, the ground contact area of the first block piece 22T in the central portion C in the tread width direction is smaller than that in the end portions $S_1$, $S_2$ in the tread width direction.

In addition, the width $W_{RC}$ of the second block piece 22R in the tread circumferential direction in the central portion C of the block 20 in the tread width direction shown in FIG. 5(a) is longer than the width $W_{RS}$ of the second block piece 22R in the tread circumferential direction in the end portion $S_1$ of the block 20 in the tread width direction shown in FIG. 5(b). In other words, since the second block piece 22R has the width gradually increasing from the end portions $S_1$, $S_2$ toward the central portion C of the block 20 in the tread width direction, the ground contact area of the second block piece 22R in the central portion C in the tread width direction is larger than that in the end portions $S_1$, $S_2$ in the tread width direction.

Figure 6:
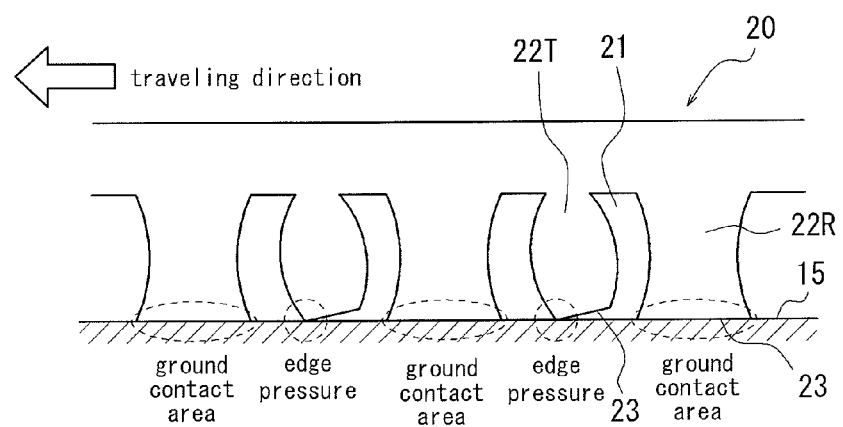
FIG. 6 is a view for explaining the effect of a pneumatic tire of the present invention.

With reference to FIG. 6, the effect of the first block piece 22T and the second block piece 22R will be described.

Although it is generally effective to generate collapse of a block in order to increase edge pressure, collapse of a block must be restrained to increase ground contact area. In a conventional pneumatic tire, it is possible to restrain decrease in ground contact area by restraining collapse of a block but edge pressure decreases as stated above and therefore, such a trade-off becomes an issue.

The inventor studied this issue and found a technique to divide the functions for every block piece to solve this trade-off. In other words, a block is not divided to block pieces having the equal shape but the block includes at least a set of first and second block pieces, each having a different shape for a different function. Specifically, the first block piece has a width in the tread circumferential direction gradually decreasing toward a block piece surface 23 (tread surface) so that the first block piece may easily collapse to increase edge pressure. In addition, the second block piece has a width in the tread circumferential direction gradually increasing toward the block piece surface 23 so that the second block piece may not be collapsed, which results in reduction in ground contact area.

In the case that a braking force is applied while a tire is rolling in a direction of arrow as shown in FIG. 6 on an icy road surface 15, for example, a force for collapsing the first block piece 22T and the second block piece 22R in the opposite direction to the traveling direction is applied. The first block piece 22T is easily collapsed as described below and local deformation in the edge portion surrounded by a circle in broken lines in FIG. 6 is increased so that edge pressure of the edge portion is improved. Since the first block piece has the gradually decreasing shape toward the road surface, the edge portion of the first block piece has an obtuse angle under load and the rubber in the edge portion expands in a direction toward the road surface rather than a direction parallel to the road surface, as a result of which, the edge portion is easily to be constrained with respect to the road surface. On the other hand, since the second block piece 22R has the gradually increasing shape toward the road surface, the second block piece 22R is not collapsed and the edge portion is not separated from the ground contact surface but deformed expanding with respect to the icy road surface 15 under load. Therefore, the ground contact area of the second block piece 22R is larger than that without load and the block piece 22R is restrained from being separated from the road surface. In this way, it is possible to improve on-ice friction performance, in particular, on-ice braking performance as a block by making the block pieces share the functions of increase in edge pressure and increase in ground contact area.

By gradually decreasing the width of the first block piece 22T in the tread circumferential direction from the end portions $S_1$, $S_2$ toward the central portion C of the block 20 in the tread width direction and by gradually increasing the width of the second block piece 22R in the tread circumferential direction from the end portions $S_1$, $S_2$ toward the central portion C of the block 20 in the tread width direction, both of the edge effect and the effect of increase in ground contact area are more emphasized so that on-ice friction performance can be significantly improved.

Since the central portion C of the block is largely deformed than the end portions $S_1$, $S_2$ of the block, the above-mentioned edge effect and the effect of increase in ground contact area can be more effectively achieved.

It is not preferable that the width of the sipe 21 is excessively wide since the ratio of the block pieces to the block 20 is reduced so that block stiffness is reduced. Therefore, it is preferable that a side wall of the first block piece 22T and a side wall of the second block piece 22R facing each other across the sipe 21 have an equal curvature and the width of the sipe 21 is constant along the tire radial direction from the inner side to the outer side.

It is preferable that the width of the first block piece 22T in the circumferential direction is smaller than the width of the second block piece 22R in the circumferential direction to reduce stiffness of the first block piece 22T and to more easily cause collapse of the first block piece 22T.

It is preferable that the width of the first block piece 22T in the bottom of the sipe 21 is small, that is, the first block piece 22T in the groove bottom is narrowed to reduce stiffness of the first block piece 22T and to more easily cause collapse of the first block piece 22T.

Figure 7:
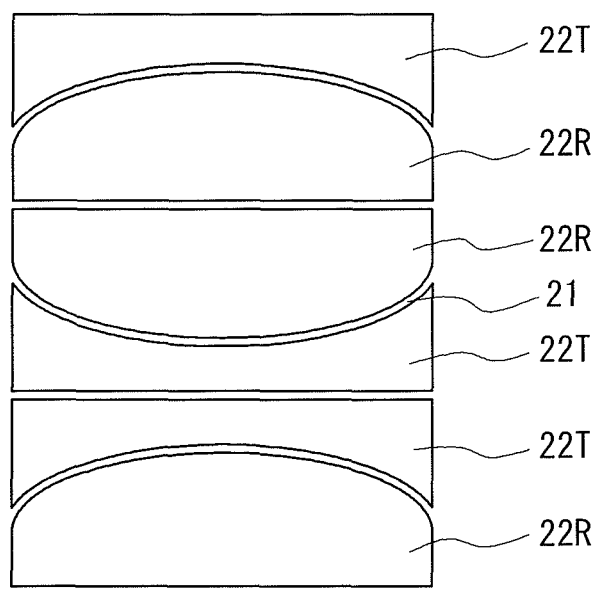
FIG. 7 shows an example of a block surface of a pneumatic tire of the present invention.

It is preferable that the first block piece 22T and the second block piece 22R are alternately arranged in tread circumferential direction over the block 20 as shown in the above-mentioned examples. It is necessary that one block 20 includes at least a set of the first block piece 22T and the second block piece 22R which are arranged next to each other. For example, as shown in the tread surface of FIG. 7, the first block pieces 22T may be arranged next to each other and the second block pieces 22R may be arranged next to each other.

Figure 8:
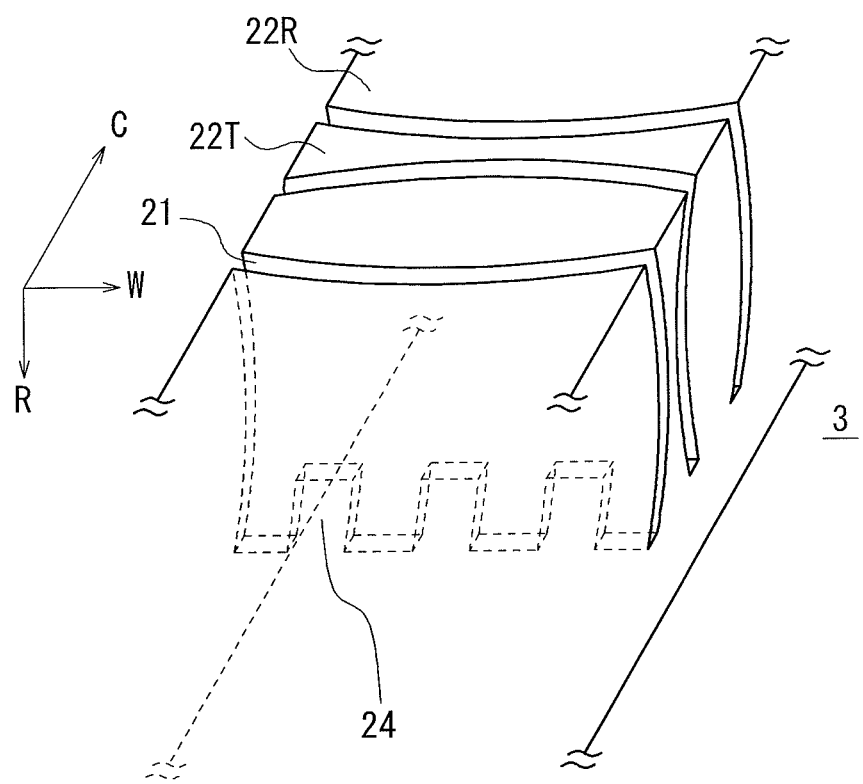
FIG. 8 is a perspective view of a part of a block according to the third embodiment of a pneumatic tire of the present invention.

FIG. 8 is a perspective view of a part of the block 20 according to the third embodiment of a pneumatic tire of the present invention. The configuration of FIG. 8 is different from that of FIG. 4 in that at least one, three bottom raised portions 24 in this example, connecting the first block piece 22T and the second block piece 22R are provided between the first block piece 22T and the second block piece 22R preferably in the bottom of the sipe 21 as shown in this example. By providing such bottom raised portions 24, collapse of the second block piece 22R is further restrained and therefore, ground contact area can be surely secured.

Although the bottom raised portions 24 are provided only in the sipe 21 of the front side in FIG. 8, it is preferable that the bottom raised portions 24 are provided in all of the sipes 21.

EXAMPLE

Pneumatic tires according to the present invention (Example tires), a conventional pneumatic tire (Conventional Example tire) and a comparative pneumatic tire (Comparative Example tire) are produced based on the following specifications and evaluated for on-ice braking performance.

Figure 9:
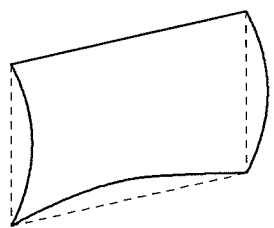
FIGS. 9(a) and 9(b) are schematic views showing a sipe shape of Example tires.
FIG. 9(c) is a schematic view showing a sipe shape of Comparative Example tire and FIG. 9(d) is a schematic view showing a sipe shape of Conventional Example tire.
Figure 9:
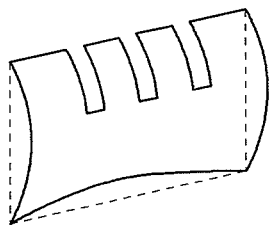
Figure 9:
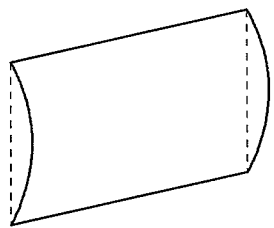
Figure 9:
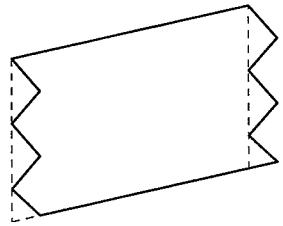

Each example tire has a tread pattern shown in FIG. 1 and a similar internal structure to that of a general pneumatic tire. FIG. 9 schematically shows the shape of the sipe (the upper side in this figure shows a sipe bottom) of each example tire.

Example tire 1 has the block pieces and the sipes as shown in FIG. 4 and FIG. 5. The sipe is curved from the sipe bottom toward the tread surface and curved from the both ends toward the central portion in the width direction as shown in FIG. 9(a).

Example tire 2 is similar to Example tire 1 except that it has the bottom raised portion 24 as shown in FIG. 8 and the sipe shape shown in FIG. 9(b).

Example tire 3 has the block pieces and the sipes as shown in FIG. 2 and FIG. 3.

Comparative Example tire is similar to Example tire 1 except that it has the sipe shown in FIG. 9(c) and the width of the block piece in the tread circumferential direction in the end portion in the tread width direction is the same as that in the central portion in the tread width direction.

Conventional Example tire has a sipe of a so-called washboard type (FIG. 9(d)).

Each example tire has a tire size of 195/65R15. Each tire is mounted to a standard rim to be a tire wheel and then applied with tire internal pressure of 200 kPa. The above-mentioned tire wheel is attached to a passenger car and examined for braking performance on an icy road. A braking distance until the car stops by braking hard from the initial speed of 40 km/h is measured and the average deceleration is calculated from the initial speed and thus-measured braking distance. The results are shown in Table 1 in index values of the average deceleration. The index values are calculated by defining the average deceleration of Conventional Example tire as 100 and the larger index value means the better result.

TABLE 1

| Tire | On-ice performance index |
| --- | --- |
| Conventional Example tire | 100 |
| Comparative Example tire | 114 |
| Example tire 1 | 125 |
| Example tire 2 | 132 |
| Example tire 3 | 120 |

It is found from Table 1 that on-ice performance is improved in Example tires in comparison to Conventional Example tire and Comparative Example tire.

Therefore, by gradually decreasing the width of the first block piece in the tread circumferential direction from the end portions toward the central portion in the tread width direction and by gradually increasing the width of the second block piece in the tread circumferential direction from the end portions toward the central portion in the tread width direction, a pneumatic tire to improve on-ice performance can be provided.

The invention claimed is:

1. A pneumatic tire comprising plural blocks on a tread surface of the tire defined by plural circumferential grooves extending in a tread circumferential direction and plural lateral grooves extending in a tread width direction and provided with plural sipes extending in the tread width direction, wherein each of the blocks is divided into plural block pieces including a set of a first block piece and a second block piece which are arranged next to each other, the first block piece has a width in the tread circumferential direction gradually decreasing from end portions toward a central portion of the block in the tread width direction, the second block piece has a width in the tread circumferential direction gradually increasing from end portions toward a central portion of the block in the tread width direction, the width of the first block piece in the tread circumferential direction gradually decreases toward the tread surface, and the width of the second block piece in the tread circumferential direction gradually increases toward the tread surface, and wherein the width of the first block piece in the tread circumferential direction gradually increases and then gradually decreases along a tire radial direction from an inner side to an outer side, and the width of the second block piece in the tread circumferential direction gradually decreases and then gradually increases along the tire radial direction from an inner side to an outer side.

2. The pneumatic tire according to claim 1, wherein a side wall of the first block piece and a side wall of the second block piece facing each other across the sipe have an equal curvature.

3. The pneumatic tire according to claim 1, wherein at least one bottom raised portion connecting the first block piece and the second block piece is provided between the first block piece and the second block piece.

* * * * *